(12) United States Patent
Das et al.

(10) Patent No.: US 12,380,093 B1
(45) Date of Patent: Aug. 5, 2025

(54) PERFORMING WRITES FROM A CONSUMER DATABASE TO A PRODUCER DATABASE

(71) Applicant: Amazon Technologies, Inc., Seattle, WA (US)

(72) Inventors: Sudipto Das, Redmond, WA (US); Sanuj Basu, San Mateo, CA (US); Fabian Oliver Nagel, Berlin (DE); Mohammad Foyzur Rahman, Newark, CA (US); Ewout Willem Prangsma, Grubbenvorst (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/518,893

(22) Filed: Nov. 24, 2023

(51) Int. Cl.
*G06F 16/25* (2019.01)
*G06F 16/23* (2019.01)
*G06F 16/28* (2019.01)

(52) U.S. Cl.
CPC ...... *G06F 16/2379* (2019.01); *G06F 16/2343* (2019.01); *G06F 16/25* (2019.01); *G06F 16/285* (2019.01)

(58) Field of Classification Search
CPC ............... G06F 16/2379; G06F 16/285; G06F 16/2343; G06F 16/25
USPC ....................................... 707/707
See application file for complete search history.

(56) References Cited

U.S. PATENT DOCUMENTS

| | | | |
|---|---|---|---|
| 5,778,373 | A | 7/1998 | Levy et al. |
| 9,411,864 | B2 | 8/2016 | Glider et al. |
| 11,108,828 | B1 | 8/2021 | Curtis et al. |
| 2016/0063030 | A1 | 3/2016 | Chen |
| 2017/0223117 | A1 | 8/2017 | Messerli et al. |
| 2018/0322156 | A1* | 11/2018 | Lee .......... G06F 16/23 |

OTHER PUBLICATIONS

U.S. Appl. No. 18/518,892, filed Nov. 24, 2023, Sudipto Das, et al.
U.S. Appl. No. 18/518,891, filed Nov. 24, 2023, Sudipto Das, et al.

* cited by examiner

*Primary Examiner* — Baoquoc N To
(74) *Attorney, Agent, or Firm* — S. Scott Foster; Kowert, Hood, Munyon, Rankin & Goetzel, P.C.

(57) ABSTRACT

A consumer database of a service provider network may perform writes to a producer database. To do so, the consumer database obtains metadata and a transaction context from the producer database and uses that information to perform a write from the consumer database to the producer database. A consumer database may access (read and/or write) a producer database that uses a different topology to manage data. To do so, the consumer database obtains topology metadata from the producer database and uses the topology metadata to perform a query (read or write) from the consumer database to the producer database. A consumer database may access a producer database based on a mapping of local user IDs to consumer databases at the producer database. The access may be granted to the consumer database based on permissions assigned to the local user IDs.

20 Claims, 15 Drawing Sheets

| consumer database engine to local user ID mapping 1010 | |
|---|---|
| Consumer DB Engine A | UID_X |
| Consumer DB Engine B | UID_Y |
| Consumer DB Engine C | UID_Z |
| Consumer DB Engine F | UID_XX |
| Consumer DB Engine M | UID_XY |

FIG. 10

PERFORMING WRITES FROM A CONSUMER DATABASE TO A PRODUCER DATABASE

BACKGROUND

As the technological capacity for organizations to create, track, and retain information continues to grow, a variety of different technologies for managing and storing information have been developed. Database systems, for example, provide clients with different options to customize configurations of hardware and software to manage stored information. However, the increasing amounts of data that organizations must store and manage often correspondingly increases both the size and complexity of data storage and management technologies, like database systems, which in turn escalate the cost of maintaining the information. Therefore, organizations seek to reduce both the complexity and storage requirements of maintaining data while simultaneously improving the efficiency of data processing

BRIEF DESCRIPTION OF THE DRAWINGS

FIG. 10 illustrates an example of a consumer database engine to local user ID mapping, according to some embodiments.

Figure 1:
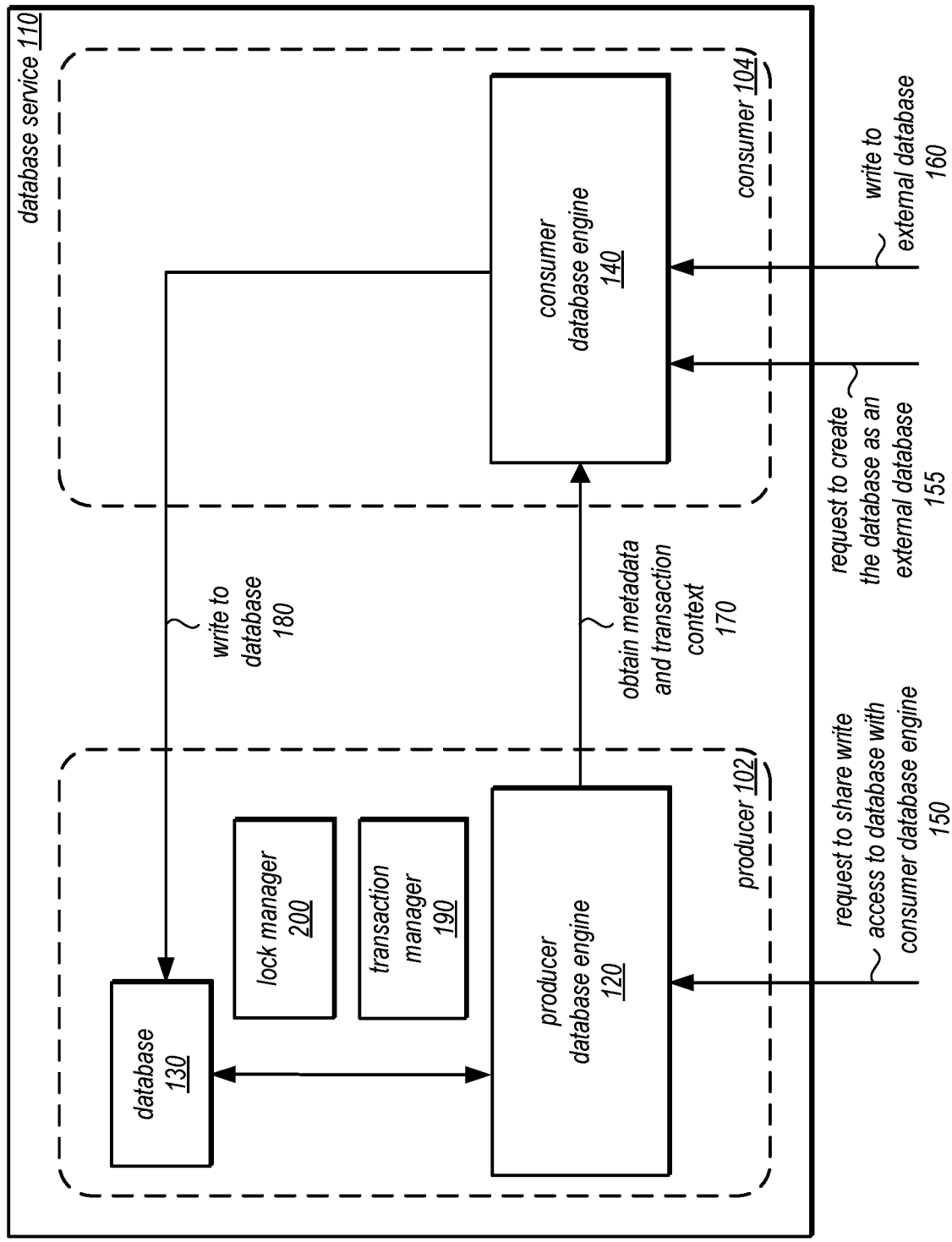
FIG. 1 illustrates a logical block diagram for performing writes from a consumer database to a producer database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of performing writes from a consumer database to a producer database, according to some embodiments are described herein. By virtue of storing different data, different databases can provide insights for analysis, state information for products, processes, or systems, or any other use case for a database. While database migration and other data transmission techniques exist to copy a database from one location to another in order to grant other entities access to the database (e.g., reads or writes), such techniques do not offer the producer of the database control over the management of database data. Changes to the database that occur after migration of the database may not be incorporated into the database without obtaining another copy of the database. Techniques for performing writes from a consumer database to a producer database can remove impediments to managing database data of a producer by different consumers, by maintaining control by the producer and/or a database service over access to the producer database (by retaining control over access to metadata and transaction context for the database and the database data itself) and maintaining control over committing and aborting writes from consumers.

In some embodiments, allowing writes to be performed from a consumer database to a producer database can also be implemented to overcome geographical challenges in the distribution of data. A database stored and managed in one area (e.g., on one continent, such as Europe) may be desirably accessed in another continent (e.g., South America). In order to maintain both the control over database data and the consistency of database data, techniques for performing writes from a consumer database to a producer database, which may, for example, allow for a European region of a service provider network to share data with a South American region of the service provider network.

Various embodiments of accessing a producer database from a consumer database that uses a different topology, according to some embodiments are described herein. To improve the performance and flexibility of a database system, a database system that can access data (e.g., read and/or write) from tables of other database systems that use different topologies will increase the capabilities of the database system to access and modify data of other databases.

Various embodiments of granting a consumer database access to a producer database based on local user ID mappings, according to some embodiments are described herein. To improve flexibility and control of a producer database to provide access of its data to other consumer databases, the producer database can leverage the use of local user IDs by mapping a different local user ID to each consumer database and allowing or denying data access (e.g., reads and/or writes) to each consumer database according to the permissions that are assigned to the local user ID for the consumer database. In embodiments, this reduces the complexity and the amount of custom code/compute resources that would be used compared to traditional techniques for creating and managing various permissions.

FIG. 1 illustrates a logical block diagram for performing writes from a consumer database to a producer database, according to some embodiments. Database service 110 may be a stand-alone database service, in various embodiments. For example, database service 110 may be implemented for private use (e.g., on private networks and resources for entity-specific utilization). In some embodiments, database service 110 may be implemented as part of multiple different services provided by a cloud service provider across multiple regions, such as provider network 200 discussed in detail below with regard to FIG. 2.

Database service 110 may manage databases on behalf of clients of database service 110, in various embodiments. For example, database service 110 may implement an interface that allows users to create a database to be hosted in database service 110. The interface may also allow users to specify whether the database is to be managed by the database service, automatically, in a "serverless" fashion (e.g., by allowing database service 110 to automatically determine and configure an appropriate number of computing resources to host and provide access to (e.g., query) the database).

In some embodiments, the interface may support management parameters or other information to guide the management of the database, such as a parameter indicating that query performance should be prioritized over resource efficiency (e.g., lower cost), or parameter to indicate that resource efficiency should be prioritized over query performance. In some embodiments, database service 110 may also allow for hosted databases to be manually managed by a user (e.g., via interface requests to configure a specified number of computing resources to host and provide access to (e.g., query) the database), increase or decrease the number of computing resources, and so on.

As shown, the database service 110 includes a producer 102 (e.g., producer database and/or resources managed/owned by a producer account of the provider network) and a consumer 104 (e.g., consumer database and/or resources managed/owned by a consumer account of the provider network). In some embodiments, the producer 102 may be in a different region than the consumer 104, allowing access to database service 110 from different locations. In embodiments, regions may be separate geographical areas in which the provider network provides data centers. Client applications can connect to regions via a publicly accessible network (e.g., the Internet, a cellular communication network). In embodiments, regions may be connected to a global network which includes private networking infrastructure (e.g., fiber connections controlled by the database service) connecting each region to at least one other region. In such embodiments, the compartmentalization and geographic distribution of computing hardware enables the database service 110 to provide low-latency resource access to customers on a global scale with a high degree of fault tolerance and stability.

A database may be created and hosted for the producer to store/manage data. For example, database data 130 may be stored for the database in a data storage system (e.g., remote or attached to producer database engine). Database service 110 may implement a producer database engine 120 (e.g., one or more computing resources, such as a processing cluster discussed in detail below with regard to FIG. 4), which may manage and provide access to the database data 130. As discussed above, it may be desirable to share a database for use by other database engines. Thus the database engine 120 may receive a request to share database access to data (e.g., write and/or read access) with a consumer database engine 140 of the consumer 104, as indicated at 150. This makes database engine 120 have the role of "producer" for database data (e.g., as data may be added or removed to database data 130 via producer database engine 120). As discussed below, in some embodiments sharing the database may create a "datashare" object (e.g., a logical object, such as an identifier for the datashare allowing the datashare to be referenced in various requests to manage or access the datashare).

In embodiments, database data 130 may be stored and organized into one or more schemas (e.g., for one or more database tables). These schemas may indicate how to interpret database data 130 at a database engine (e.g., at producer database engine 120 or consumer database engine 140), such as by indicating what type of data is stored in a column, feature, or other attribute of database data. Other metadata may be used to access database data. For example, various statistics that describe the contents of database data (e.g., histograms of data values, minimum and maximum values, etc.) may also be stored as part of metadata. In some embodiments, the metadata may be organized in various data objects, such as a superblock, which may map portions of metadata to one (or more) data blocks in database data 130.

Once database data is shared, the metadata to access the database may be obtained. For example, consumer database engine 140 implemented in region 104, may be a database engine that has been authorized to access the shared database data (as discussed in detail below). In some embodiments, database service 110 (or provider network 200) may implement accounts as an access control mechanism so that producer database engine 120 may be associated with one account (e.g., the producer account) and consumer database engine 140 may be associated with another account (e.g., the consumer account).

In embodiments, the consumer 104 may create the database 130 as an external database accessible via the consumer database engine 140 (e.g., in response to a request from a user to create the database 130 as the external database 155). Consumer database engine 140 may receive a write to an external database 160 (e.g., write and to the shared database data). Consumer database engine 140 may obtain metadata describing the database from the producer database engine, as indicated at 170. In some embodiments, various private networking techniques, such as techniques that utilize logically isolated network communications (or physically isolated network communications) in order to avoid exposing metadata (e.g., if the producer and consumer are in different regions). In some embodiments, consumer database engine 140 and produce database engine 120 may not communicate directly, but instead through a proxy, as discussed in below. In this way, database engines can be isolated from potentially malicious actions or other failure events.

To perform query 160, consumer database engine 140 may utilize the metadata and the transaction context to perform a write to the database 130 (e.g., to generate a query plan to perform the query/write, including various instructions, operations, or other steps to perform, as discussed below). Consumer database engine 140 may then write to the shared database data 130 at 130 in order to perform the query/write. In some embodiments, consumer database engine 140 may utilize the same private network communication techniques as used for metadata to obtain access to shared database data 130. Although not illustrated, a result to query 160 may be returned to the consumer and/or client that submitted the query/write.

In embodiments, the producer 102 (e.g., the producer database engine) includes a transaction manager 190 that generates a transaction context describing a state of the database 130 (e.g., writable transaction context) for each write/query that the consumer database engine 140 performs on the database 130. In embodiments, in response to receiving an indication from the consumer database engine 140 of the write/query, the transaction manager may generate and/or send the transaction context to the consumer database engine 140. The consumer database engine 140 may then utilize the metadata and the transaction context to perform a write to the database 130. In embodiments, the producer 102 (e.g., the producer database engine) includes a lock manager 200 that grants and/or manages any number of locks associated with the write/query that the consumer database engine 140 performs on the database 130. In embodiments, in response to receiving an indication from the consumer database engine 140 of the write/query, the transaction manager may grant and/or manages any number of locks associated with the write/query.

In various embodiments, any type of data manipulation language (DML) instructions may be used at a producer database to manipulate data (e.g., insert, update, delete, etc.) of a producer database as well as any type of data definition language (DDL) instructions (e.g., create table, alter table, etc.) at the producer database to define data structures, using the techniques described herein for performing queries, writes, reads, etc. For example, a consumer user may create a table on the producer database by executing a query on the producer database. To do so, the consumer database and/or the producer database may transform a query received from the consumer user (e.g., create table A) into a transformed query (e.g., transforming the query from the consumer database schema/namespace into the producer schema, namespace, and/or topology) that is then executed on the producer database (e.g., creating table A at the producer database according to the producer's schema, namespace, and/or topology). In embodiments, the consumer user may create and own any number of tables or other database objects at a remote producer database in the same manner. Using the above techniques, a consumer user may cause execution of a query on the producer database to perform DML and/or DDL instructions at the producer database.

Please note that the previous description of a database service is a logical description and thus is not to be construed as limiting as to the implementation of database engines, a database service, database data, regions, and performance of queries, or portions thereof.

This specification continues with a general description of a provider network that implements multiple different services, including a database service and storage service, which may implement writes from a consumer database to a producer database, access a producer database from a consumer database that uses a different topology, and/or grant a consumer database access to a producer database based on local user ID mappings. Then various examples of the database service and storage service, including different components/modules, or arrangements of components/module that may be employed as part of implementing the services are discussed.

A number of different methods and techniques to implement writes from a consumer database to a producer database, access a producer database from a consumer database that uses a different topology, and/or grant a consumer database access to a producer database based on local user ID mappings are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
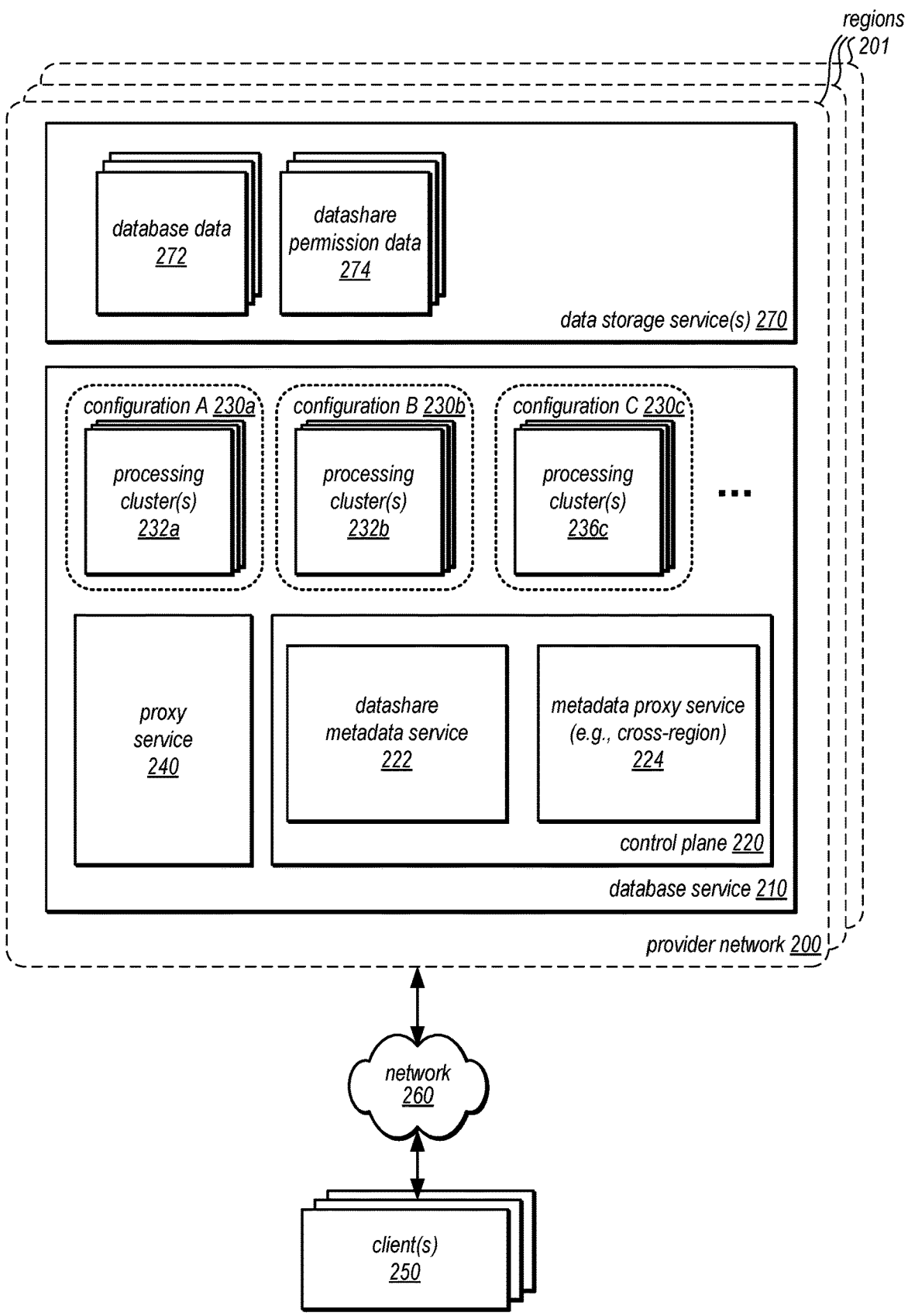
FIG. 2 is a logical block diagram illustrating a provider network offering a database service and a data storage service, according to some embodiments.

FIG. 2 is a logical block diagram illustrating a provider network offering a database service and a data storage service, according to some embodiments. In some embodiments, the database service privately shares database data across provider network regions, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 2000 described below with regard to FIG. 15), needed to implement and distribute the infrastructure and storage services offered by the provider network 200. The provider network 200 can be formed as a number of regions (e.g., regions 201), where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 15 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows, database service 210 may be discussed according to the various features or components that may be implemented as part of a data warehouse service, including control plane 220, proxy service 240, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 2000 described below with regard to FIG. 15. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

Control plane 220 may also implement various systems to manage or implement database service 210 features. For example, control plane 220 may implement datashare metadata service 222 and cross-region metadata proxy service 224. As discussed in detail below with regard to FIG. 3, these systems may be used to implement datashares accessible to any number of consumer database engines and/or across different provider network regions 200. Data used to implement these features, such as datashare permission data 274 may be maintained in separate data storage service(s) 270, in some embodiments.

As discussed above, various clients (or customers, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

In at least some embodiments, database service 210 may implement proxy service 240 to provide access to databases (e.g., data warehouses) hosted in database service 210. For databases managed by database service 210, database service 210 may provide database endpoints 242 (e.g., network endpoints) for a hosted database. Database endpoints 242 may not provide direct access to a particular processing cluster 232, as the processing cluster used to respond to such requests (e.g., queries) may change according to the various scaling techniques. Instead, client applications may utilize the database endpoint 242 for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 232a, 232b, and 232c, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, processing clusters may implement local data processing, such as local data processing, (discussed below with regard to FIG. 4) to plan and execute the performance of queries with respect to local data in the processing cluster, as well as a remote data processing client.

Database service 210 may implement different types or configurations of processing clusters. For example, different configurations A 230*a*, B 230*b*, and C 230*c*, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces.

Generally speaking, clients 250 may encompass any type of client that can submit network-based requests to provider network 200 via network 260, including requests for storage services (e.g., a request to create a datashare at a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210 and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
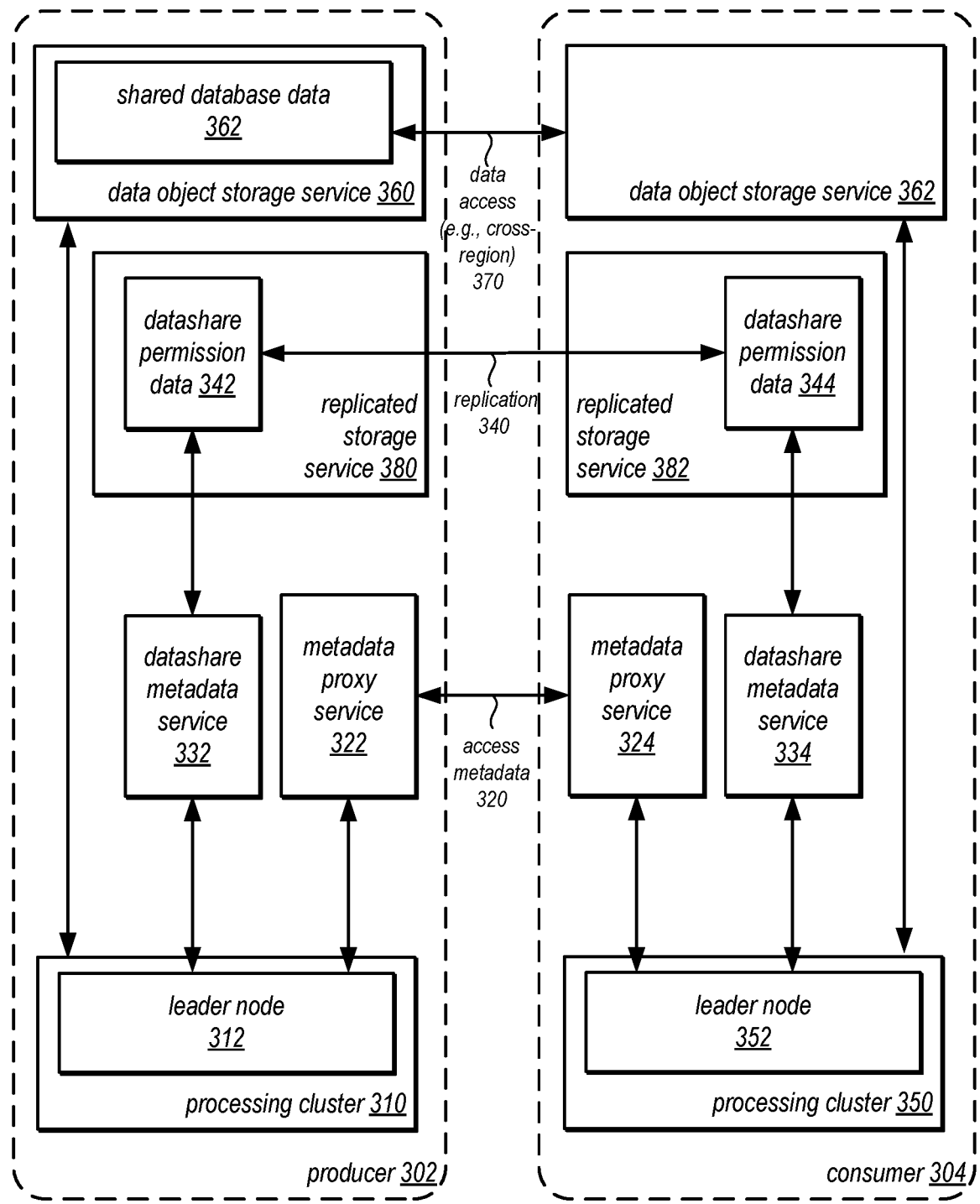
FIG. 3 is a logical block diagram illustrating interactions between control plane components to share access to database data, according to some embodiments.

FIG. 3 is a logical block diagram illustrating interactions between control plane components to share database data, according to some embodiments. As discussed in detail below with regard to FIG. 5, users may create datashares, grant permission for datashares, accept permissions for data shares, and utilize datashares across provider network regions. In order to support these interactions, different instantiations of database service 210 systems may communicate and work to support these features.

For example, as illustrated in FIG. 3, producer 302 and producer 304 may have processing clusters 310 and 350, respectively (in some embodiments, producer 302 may be in a different region than consumer 304). As discussed in detail below with regard to FIG. 4, these processing clusters may each implement leader nodes, such as leader node 312 and leader node 352, which may support interactions with client applications and other systems, such as control plane systems datashare metadata service 332, metadata proxy service 322, metadata proxy service 324, and datashare metadata service 334.

As discussed in detail below with regard to FIG. 5, datashare metadata service 332 may manage interactions with datashare permission data 342 and datashare metadata service 334 may manage interactions with datashare permission data 342. In this way, requests to create a datashare, authorize accounts, users, organizations, or other entities to access the datashare, conditions or limitations on the datashare (e.g., excluding sharing the data to certain provider network regions), may be read, updated, or otherwise accessed in order to facilitate datashares (e.g., cross-region datashares in some embodiments). As indicated at 340, replication of datashare permission data 342 and 344 so that the implementations of replicated storage service, 380 and 382, may utilize a replication feature (e.g., a global table or other cross region replication feature for database tables or other data objects supported by replicated storage service may be used). Note that many different types of data storage services that replicate data (e.g., cross-region) may be used.

Figure 4:
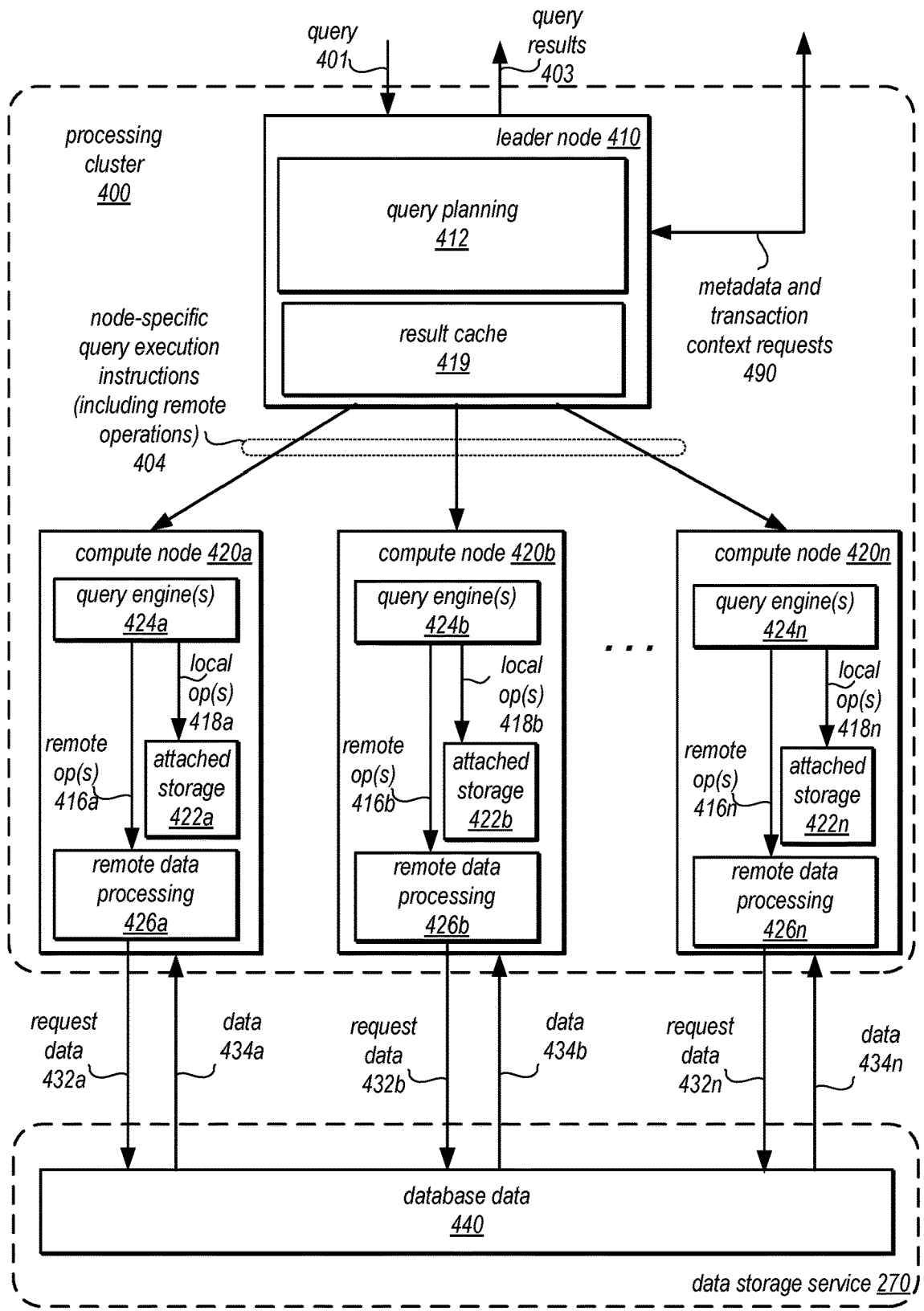
FIG. 4 is a logical block diagram illustrating an example processing cluster of a database service, according to some embodiments.

FIG. 4 is a logical block diagram illustrating an example processing cluster of a database service, according to some embodiments. Processing cluster 400 may be query processing cluster, like processing clusters 232 discussed above with regard to FIG. 2, that distributes execution of a query among multiple computational (which may also be referred to as "compute") nodes. As illustrated in this example, a processing cluster 400 may include a leader node 410 and compute nodes 420a, 420b, and 420n, which may communicate with each other over an interconnect (not illustrated). Leader node 410 may implement query planning 412 to generate query plan(s), query execution 414 for executing queries on processing cluster 400 that perform data processing that can utilize remote query processing resources for remotely stored data (e.g., by utilizing one or more query execution slot(s)/queue(s) 417). As described herein, each node in a primary processing cluster 400 may include attached storage, such as attached storage 422a, 422b, and 422n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 400 is a leader node as illustrated in FIG. 4, but rather different nodes of the nodes in processing cluster 400 may act as a leader node or otherwise direct processing of queries to data stored in processing cluster 400. While nodes of processing cluster may be implemented on separate systems or devices, in at least some embodiments, some or all of processing cluster may be implemented as separate virtual nodes or instance on the same underlying hardware system (e.g., on a same server).

Leader node 410 may manage communications with clients, such as clients 250 discussed above with regard to FIG. 2. As discussed above with regard to FIG. 3, leader node 410 may communicate with proxy service 240 and may receive query 401 and return query results 403 to proxy service 240 (instead of communicating directly with a client application). Alternatively, in those embodiments where leader node 410 implements database query queue 320 and query routing 330 as a primary cluster, then leader node 410 may act as the proxy for other, secondary clusters, attached to the database, and may return query results directly to a client application.

Leader node 410 may be a node that receives a query 401 from various client programs (e.g., applications) and/or subscribers (users) (either directly or routed to leader node 410 from proxy service 240), then parses them and develops an execution plan (e.g., query plan(s)) to carry out the associated database operation(s)). More specifically, leader node 410 may develop the series of steps necessary to obtain results for the query. Query 401 may be directed to data that is stored both locally within processing cluster 400 (e.g., at one or more of compute nodes 420) and data stored remotely. Leader node 410 may also manage the communications among compute nodes 420 instructed to carry out database operations for data stored in the processing cluster 400. For example, node-specific query instructions 404 may be generated or compiled code by query execution 414 that is distributed by leader node 410 to various ones of the compute nodes 420 to carry out the steps needed to perform query 401, including executing the code to generate intermediate results of query 401 at individual compute nodes may be sent back to the leader node 410. Leader node 410 may receive data and query responses or results from compute nodes 420 in order to determine a final result 403 for query 401.

A database schema, data format and/or other metadata information for the data stored among the compute nodes, such as the data tables stored in the cluster, may be managed and stored by leader node 410. Query planning 412 may account for remotely stored data by generating node-specific query instructions that include remote operations to be directed by individual compute node(s). Although not illustrated, in some embodiments, a leader node may implement burst manager to send 406 a query plan generated by query planning 412 to be performed at another attached processing cluster and return results 408 received from the burst processing cluster to a client as part of results 403. Query planning 412 may rely upon metadata updated via metadata requests 490 to other leader nodes in other regions to perform queries on datashares in other regions. Similarly, leader node 410 may return metadata in response to requests from other leader nodes of processing clusters.

In at least some embodiments, a result cache 419 may be implemented as part of leader node 410. For example, as query results are generated, the results may also be stored in result cache 419 (or pointers to storage locations that store the results either in primary processing cluster 400 or in external storage locations), in some embodiments. Result cache 419 may be used instead of other processing cluster capacity, in some embodiments, by recognizing queries which would otherwise be sent to another attached processing cluster to be performed that have results stored in result cache 419. Various caching strategies (e.g., LRU, FIFO, etc.) for result cache 419 may be implemented, in some embodiments. Although not illustrated in FIG. 4, result cache 419 could be stored in other storage systems (e.g., other storage services, such as a NoSQL database) and/or could store sub-query results.

Processing cluster 400 may also include compute nodes, such as compute nodes 420a, 420b, and 420n. Compute nodes 420, may for example, be implemented on servers or other computing devices, such as those described below with regard to computer system 2000 in FIG. 15, and each may include individual query processing "slices" defined, for example, for each core of a server's multi-core processor, one or more query processing engine(s), such as query engine(s) 424a, 424b, and 424n, to execute the instructions 404 or otherwise perform the portions of the query plan assigned to the compute node. Query engine(s) 424 may access a certain memory and disk space in order to process a portion of the workload for a query (or other database operation) that is sent to one or more of the compute nodes 420. Query engine 424 may access attached storage, such as 422a, 422b, and 422n, to perform local operation(s), such as local operations 418a, 418b, and 418n. For example, query engine 424 may scan data in attached storage 422, access indexes, perform joins, semi joins, aggregations, or any other processing operation assigned to the compute node 420.

Query engine 424a may also direct the execution of remote data processing operations, by providing remote operation(s), such as remote operations 416a, 416b, and 416n, to remote data processing clients, such as remote data processing client 426a, 426b, and 426n. Remote data processing clients 426 may be implemented by a client library, plugin, driver or other component that sends request sub-queries to be performed by data storage service 220 or requests to for data, 432a, 432b, and 432n. As noted above, in some embodiments, remote data processing clients 426 may read, process, or otherwise obtain data 434a, 434b, and 434c, in response from database data 440 in data storage service 270, which may further process, combine, and or include them with results of location operations 418. This database data 440 may, in some embodiments, be a datashare in another region of provider network 200, as discussed in detail below with regard to FIG. 6.

Compute nodes 420 may send intermediate results from queries back to leader node 410 for final result generation (e.g., combining, aggregating, modifying, joining, etc.). Remote data processing clients 426 may retry data requests 432 that do not return within a retry threshold.

Attached storage 422 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats). As noted earlier in FIGS. 3 and 4, in some embodiments processing clusters may access shared database data in other regions.

Figure 5:
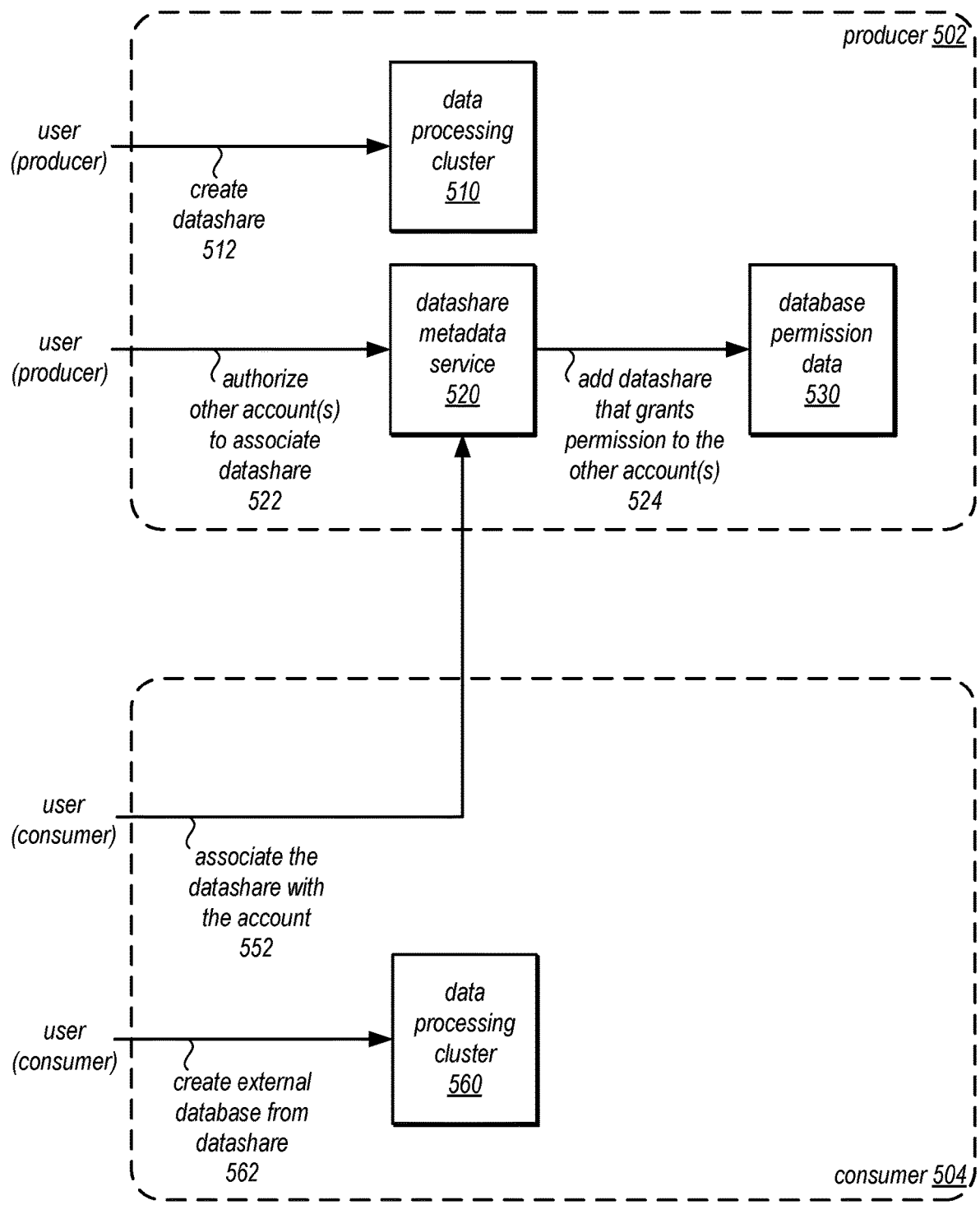
FIG. 5 is a logical block diagram illustrating interactions to create and use a datashare of a producer database to share access to database data with a producer database, according to some embodiments.

FIG. 5 is a logical block diagram illustrating interactions to create and use a datashare of a producer database to share access to database data with a producer database, according to some embodiments. In some embodiments, the producer 502 may be in a different region than the consumer 504. Although FIG. 5 may discuss interactions to create and use datashares for database data for a producer and consumer(s) that are in different provider network regions, in various embodiments the producer and consumer(s) may be in the same region, the same data center, the same cluster, etc.

Producer 502 may host data processing cluster 510, which may manage a database. Data processing cluster 510 may receive from a user a request to create datashare 512, which may allow data processing cluster 510 to respond to requests for metadata and access credentials for database data. Request 512 may be received through an interface that communicates with data processing cluster 510 (e.g., a command line or other data plane interface or programmatic interface, such as an interface that may also accept queries and other data access requests).

As illustrated at 522, a request to authorize other account (s) to associate the datashare may be received at datashare metadata service 520 in producer 502. For example, a command line, administrator console, or other control plane interface may be used to identify the accounts and the data share to be associated. Various permissions, including limitations on the consumer regions that can access the datashare may be specified as part of the authorization request. In some embodiments, once the producer authorizes the datashare, it enables the consumer (e.g., a principal/user/or identity for the account) to accept the share authorization in any provider network region. The producer may not have any control over how the datashare is used by consumer, so when it authorizes the data share, consumer principal can accept it in any region and associate to any processing cluster. In other embodiments, limitations or controls may be applied as part of authorization (e.g., limiting datashare to particular regions or excluding particular regions). Datashare metadata service 520 may in turn update database permission data 530, as indicated 524, which may be replicated to consumer 504 in database permission data 540.

As indicated at 552, a request in consumer 504 to datashare metadata service 520 may be received to associate the datashare with the account, in some embodiments. Datashare metadata service 520 may access 524 database permission data 540 in order to determine whether the association may proceed (e.g., yes, no because not authorized, no because an unauthorized region, etc.). Datashare can be associated in all (available) regions, or in particular ones identified in the request, as illustrated above. Request 552 may be received via a command line, administrator console, or other control plane interface.

As indicated at 562, a request to create a datashare as an external database or schema at data processing cluster 560 may be received. Request 562 may be received through an interface that communicates with data processing cluster 560 (e.g., a command line or other data plane interface or programmatic interface, such as an interface that may also accept queries and other data access requests.

Figure 6:
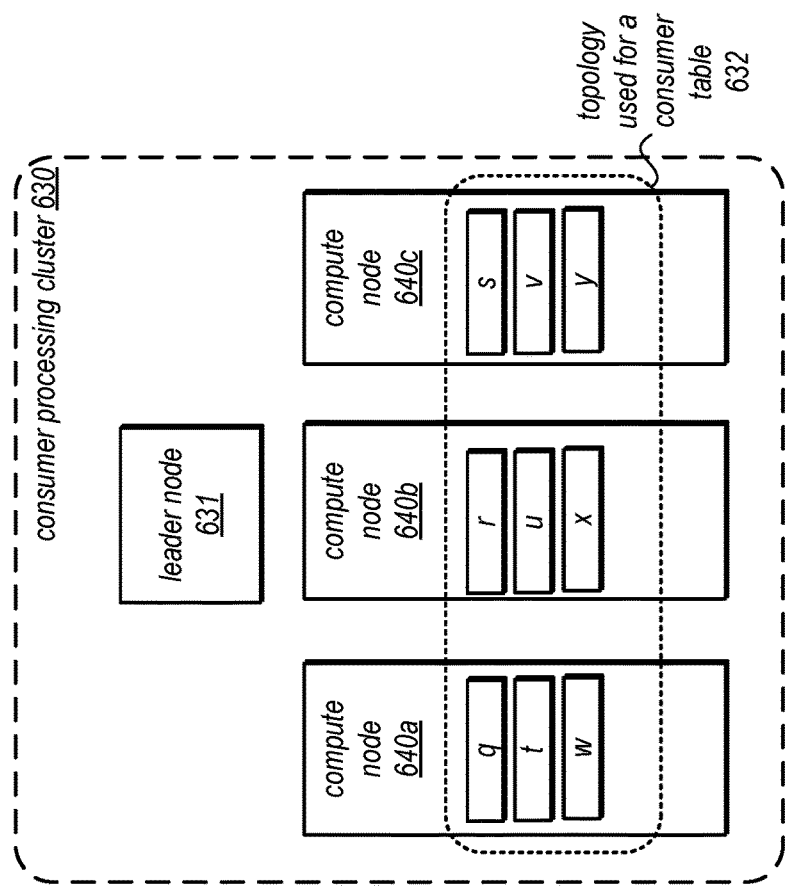
FIG. 6 is a logical block diagram illustrating an example of a producer processing cluster that manages table data according to a topology and a consumer processing cluster that manages table data according to a different topology, according to some embodiments.
Figure 6:
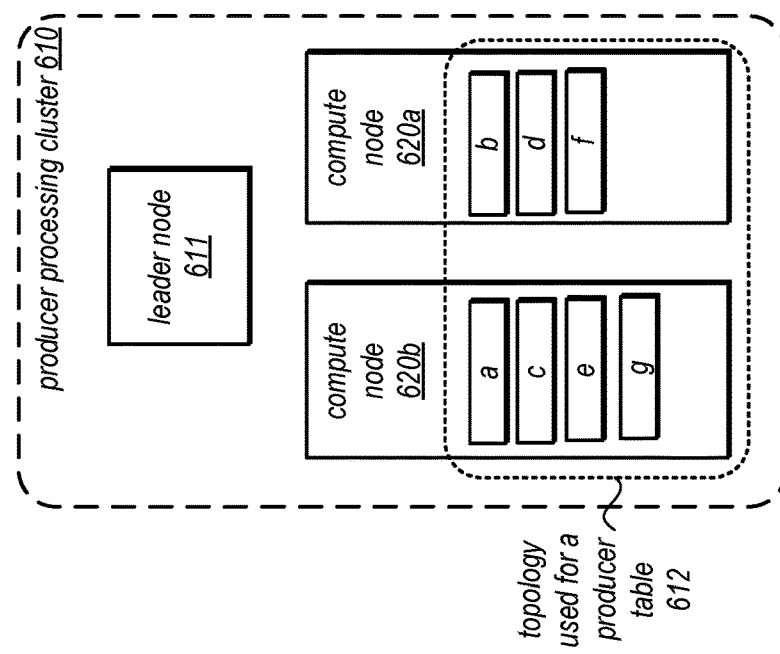

FIG. 6 is a logical block diagram illustrating an example of a producer processing cluster that manages table data according to a topology and a consumer processing cluster that manages table data according to a different topology, according to some embodiments.

Producer processing cluster 610, may store one or more tables at compute nodes 620a and 620b according to a topology used for a producer table 612 (e.g., storing partitions a through g). In embodiments, each table at the producer processing cluster 610 may be stored across compute nodes 620a and 620b according to the depicted topology, using partitions a through g. Processing cluster 630 may store one or more tables at compute nodes 640a, 640b, and 640c according to a topology used for a consumer table 632 (e.g., storing partitions q through y). In embodiments, each table at the consumer processing cluster 630 may be stored across compute nodes 6240a, 640b, and 640c according to the depicted topology, using partitions q through y. As discussed herein, various approval techniques may be supported by database services to share data from one database with another. In the illustrated example, one or more tables on producer processing cluster 610 may be shared with processing cluster 630.

Figure 7:
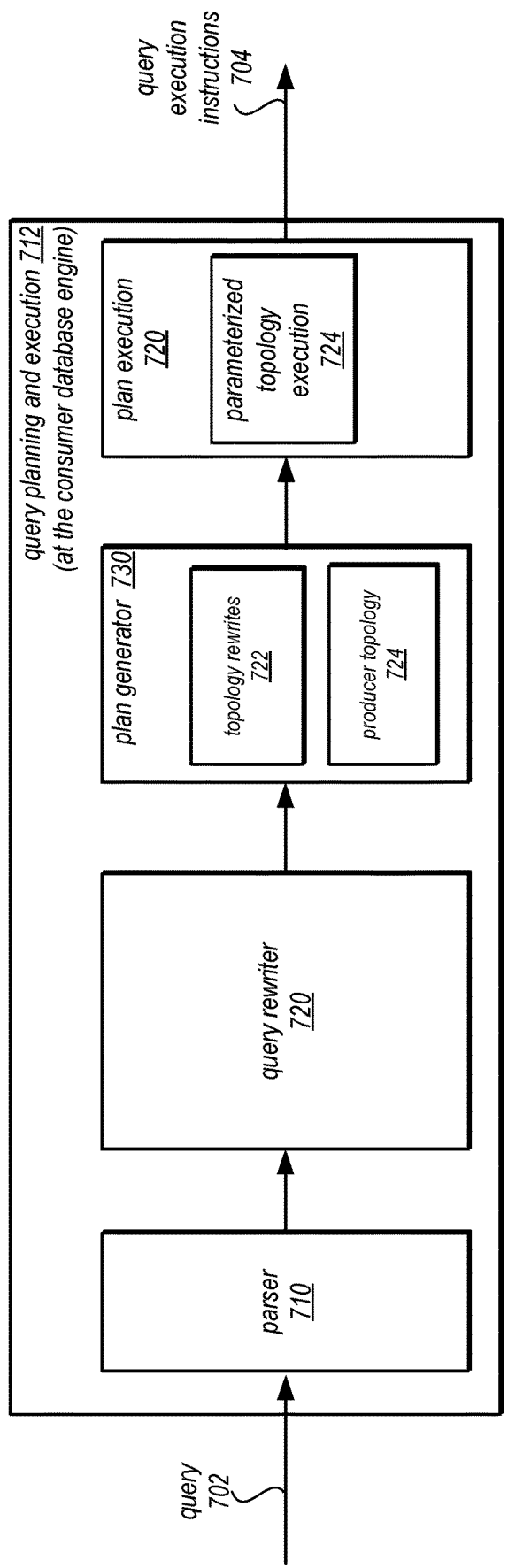
FIG. 7 is a logical block diagram illustrating query planning for a query engine implemented by a processing cluster for a consumer database that writes to a producer database that uses a different topology, according to some embodiments.

FIG. 7 is a logical block diagram illustrating query planning for a query engine implemented by a processing cluster for a consumer database that writes to a producer database that uses a different topology, according to some embodiments.

Query planning and execution 712 may implement parser 710 to receive a write and/or query statement, such as a SQL statement, and determine the various requested operations to perform as a result of the query. For example, parser 710 may generate a query tree for a given query input string to separate out the various query clauses, fields, predicates, conditions, commands, or other query information for planning and optimization.

Query planning and execution 712 may implement query rewriter 720 to rewrite the parsed query, in some embodiments. Different query rewriting rules may be applied to determine the parsed queries (e.g., by determining an initial symbol tree or other expansion of the query, then rewriting the query in different ways to rearrange the locations of operators). Query rewriting rules may, for instance, identify modifications to the initially created symbol tree by rearranging or re-ordering operations. Some query rewriting rules may involve different choices (e.g., different orderings of operations, such as joins, as well as different assignments depending on the topologies to write to), and thus the different possible query plans may be generated as a result of the different choices identified by the query rewriting rules.

Query rewriter 720 may also perform other rewrites to further optimize performance of the query. For example, query rewriter 720 may have access to metadata (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree.

The rewritten query may then be provided to plan generator 730. Plan generator 730 may perform various operations to generate a query execution plan (e.g., a tree of plan operation nodes, which may be later used to generate query execution code). For example, plan generator 730 may obtain/identify the producer topology 724 (e.g., topology used for producer tables). The producer topology 724 may then be applied to rewrite the query according to the topology, as indicated at 722. Plan generator 730 may also implement partition elimination, which may use metadata to filter out partitions (e.g., portions of or entire data objects) from evaluation for executing the query. For example, partition elimination may receive a list of predicates as part of query 702 and along with a list of partitions (for local and/or remote data) along with range values or other information describing the values stored within the partitions. If an evaluation of a predicate compared with the range values or other value description information were to exclude that partition from satisfying the query predicate (e.g., values in the partition are out of a range for the predicate), then operations to evaluate (e.g., scan) the partition may be removed. In scenarios where the partitions removed are partitions of remote data, in addition to saving processing costs, removal of partitions would save transmission costs (e.g., network bandwidth) to move results from remote data.

Query planning and execution 712 may implement plan execution 740. Plan execution 740 may receive the query plan, generate instructions to perform the query plan, and send the query execution instructions (e.g., to compute nodes of a processing cluster of the producer). For example, the instructions may be generated and sent as code (or executables). Parameterized topology execution 724 may allow for the different topology data (e.g., assignment mapping from hash partitions to data slices and then hash maps used for distribution that maps a hash value to the data slice that hosts the corresponding data partition) to be included (or made available for lookup) by each of the compute nodes (or inserted as part of plan execution 740 when generating the instructions). In this way, query execution instructions 704 will use the producer's topology.

In some embodiments, proxy tables at the consumer database that represent/correspond to the producer tables may be created in order to allow the consumer database to access the producer tables (e.g., read and/or write). A proxy table may be a versioned table that are created based on metadata from the producer (e.g., versioned tables on top of producer metadata). For example, a read may be performed on version A of a table at the consumer and a write may be performed on version B of a table (instead of both queries being performed on the same local table). In some embodiments, after a write is performed on a proxy table, then the written block headers and/or other data is sent to the producer database, where the producer database uses the block headers and/or other data to update the corresponding producer table according to the write. In some embodiments, a proxy table may be an example embodiment of the external table, described herein.

Figure 8:
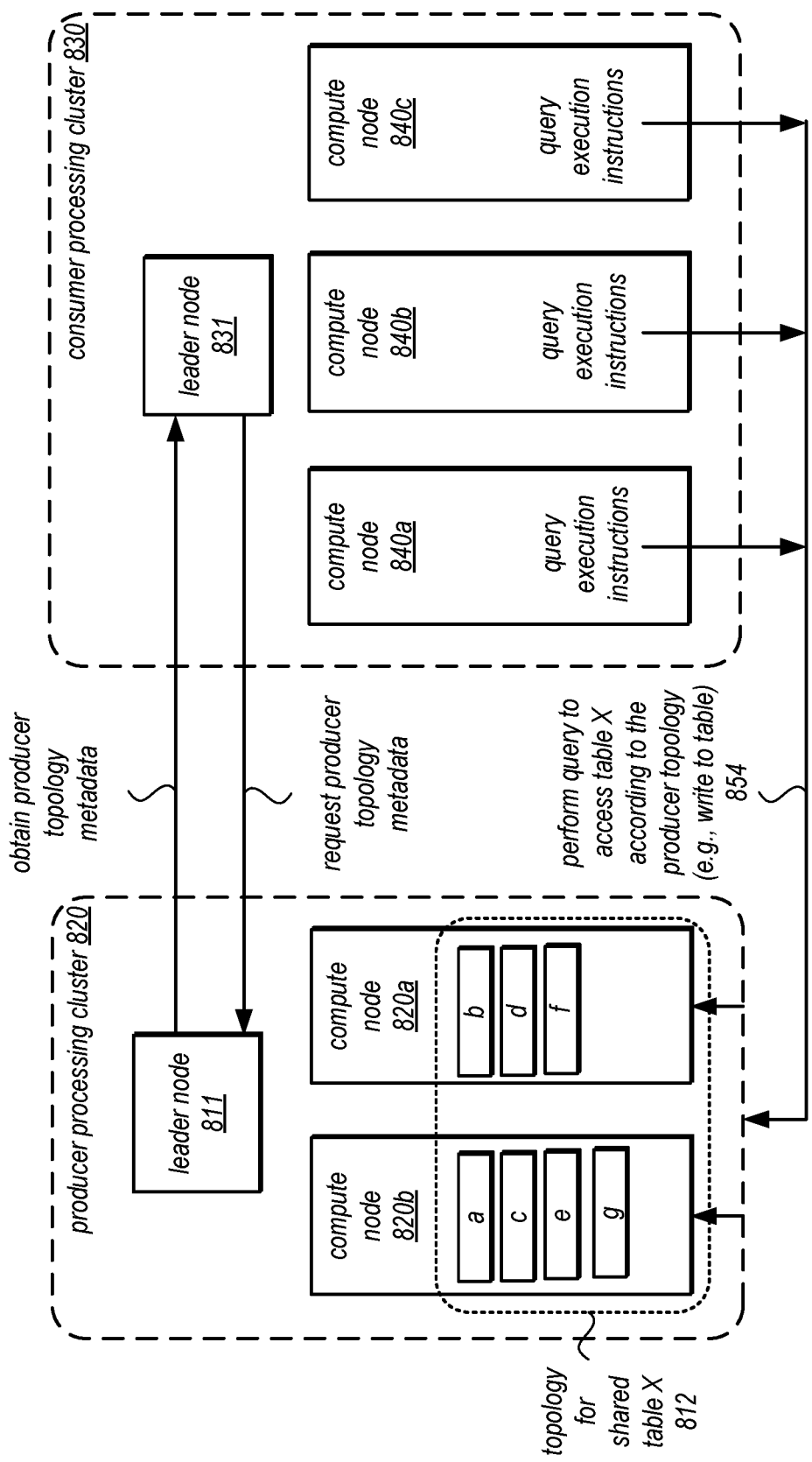
FIG. 8 illustrates a logical block diagram for accessing a producer database from a consumer database that uses a different topology, according to some embodiments.

FIG. 8 illustrates a logical block diagram for accessing a producer database from a consumer database that uses a different topology, according to some embodiments.

As shown, the leader node 831 of the consumer processing cluster 610 may send a request for topology metadata of the shared table to leader node 811 of the producer processing cluster 310. Leader node 811 may return the topology metadata for the shared table. Then, when a write from the consumer to the shared table is made, the consumer processing cluster 610 uses the topology metadata to determine the assignments of compute nodes 820a and 820b to perform the write/query from one or more of the compute nodes 840 to the shared table, as indicated at 854 (e.g., using the topology 812).

In embodiments, users may decide to share tables from a producer cluster to a consumer cluster. The techniques above may allow for executing queries/writes in a foreign topology in order to efficiently execute these queries on tables from the remote topology without any additional on-demand shuffling (e.g., when compared to executing the same query on local data). In embodiments, accessing local and remote tables from multiple producers is also executed efficiently with minimal additional shuffling.

Figure 9:
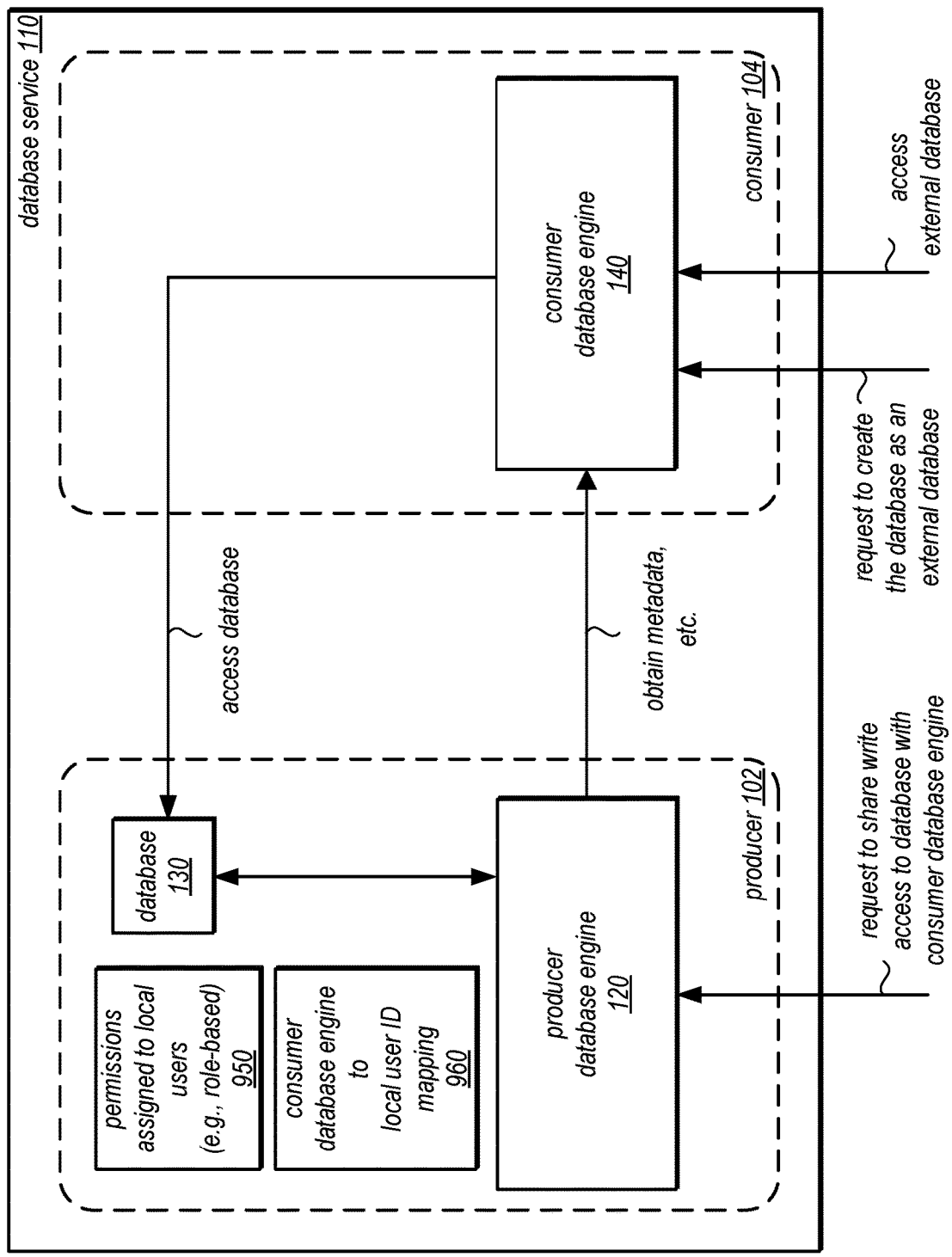
FIG. 9 illustrates a logical block diagram for granting a consumer database access to a producer database based on local user ID mappings, according to some embodiments.

FIG. 9 illustrates a logical block diagram for granting a consumer database access to a producer database based on local user ID mappings, according to some embodiments.

As depicted, the database service 110 is another example embodiment of the database service of FIG. 1. Therefore, at least some or all of the components depicted in FIG. 9 may perform in the same or similar way as described in any of the above figures. In the depicted example, the producer 102 stores permissions assigned to local users 950 and stores consumer database engine to local user ID mapping 960.

The permissions assigned to local users 950 indicates an assignment of one or more permissions for each local user ID (e.g., any number of read and/or write permissions to the database 130 and/or to any number of tables of the database). The consumer database engine to local user ID mapping 960 maps one or more consumer database engines to one or more local user IDs for producer database engine (FIG. 10 shows an example mapping).

When the producer database engine 120 receives a request to access the database 130 from the consumer (e.g., write and/or read), the producer database engine 120 determines, based on the mapping the one or more consumer database engines to the one or more local user IDs for the producer database engine, whether the consumer database engine corresponds to a local user ID for the producer database engine (e.g., whether the mapping includes a local user ID that has been assigned to the consumer database engine). If so, then the producer database engine grants to the consumer database engine the requested access to the database of the producer database engine. If not, then the producer database engine denies to the consumer database engine the requested access.

In embodiments, a role may include/specify a set of default permissions for accessing the database 130. In embodiments, each local user ID that is mapped to a consumer database engine may be granted a default role for accessing the database 130, where the default role includes/specifies a set of permissions for accessing the database. In some embodiments, the set of permissions may include/specify a set of permissions for accessing one or more particular tables of the database (e.g., the datashare may only be granted to the consumer DB engine for one or more particular tables instead of all the tables). These default permissions for a particular consumer database engine may by changed by changing the permissions for the local user ID that is mapped to the particular consumer database engine, allowing customization of permissions for each consumer database engine (e.g., by a user/administrator). As used herein, note that in various embodiments the term "producer database" and the term "consumer database" may refer to a producer database engine and consumer database engine, or vice-versa.

FIG. 10 illustrates an example of a consumer database engine to local user ID mapping, according to some embodiments.

In the depicted example, a local user ID mapping maps five consumer database engines to five different local user IDs of a producer database engine. However, in various embodiments, the local user ID mapping may maps any number of consumer database engines to different local user IDs of the producer database engine.

As described above, based on permissions assigned to the local user ID for a consumer database engine that has request access, the producer database engine may grant or deny the requested access. In embodiments, the request to access the database of the producer database engine may include an ID of the consumer database engine (e.g., "Consumer DB Engine A"), which is stored in the local user ID mapping and maps to the local user ID that has been assigned/corresponds to the consumer database engine (e.g., "UIDX").

Although FIGS. 2-10 have been described and illustrated in the context of a provider network implementing a database service, like a data warehousing service, the various components illustrated and described in FIGS. 2-10 may be easily applied to other database engines that are hosted in different regions of a provider network. As such, FIGS. 2-10 are not intended to be limiting as to other embodiments of implementing writes from a consumer database to a producer database, accessing a producer database from a consumer database that uses a different topology, and/or granting a consumer database access to a producer database based on local user ID mappings.

Figure 11:
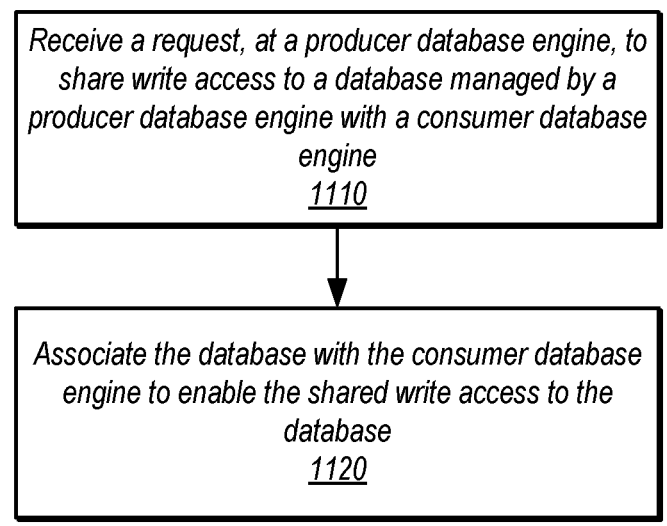
FIG. 11 is a high-level flowchart illustrating methods and techniques to implement sharing database data of a producer database with a consumer database, according to some embodiments.

FIG. 11 is a high-level flowchart illustrating methods and techniques to implement sharing database data of a producer database with a consumer database, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a third provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 1110, a producer database engine and/or control plane of a provider network may receive a request to share write access to a database (or a "datashare," which may include one or more particular tables of the database, but not all of the tables of the database) managed by the producer database engine with a consumer database engine. For example, the producer database engine may be similar to the producer database engine 120 in FIG. 1 above, implemented as a single node or distributed database engine (e.g., as a processing cluster). At 1120, the producer database engine and/or control plane associates the database with the consumer database engine to enable the shared write access to the database (e.g., to grant permission to the consumer database engine to access the database). Note that in various embodiments, the word "database" may be replaced with "datashare," for cases in which the consumer database is requesting access to one or more particular producer tables, instead of the entire database of the consumer (e.g., read and/or write access).

Figure 12:
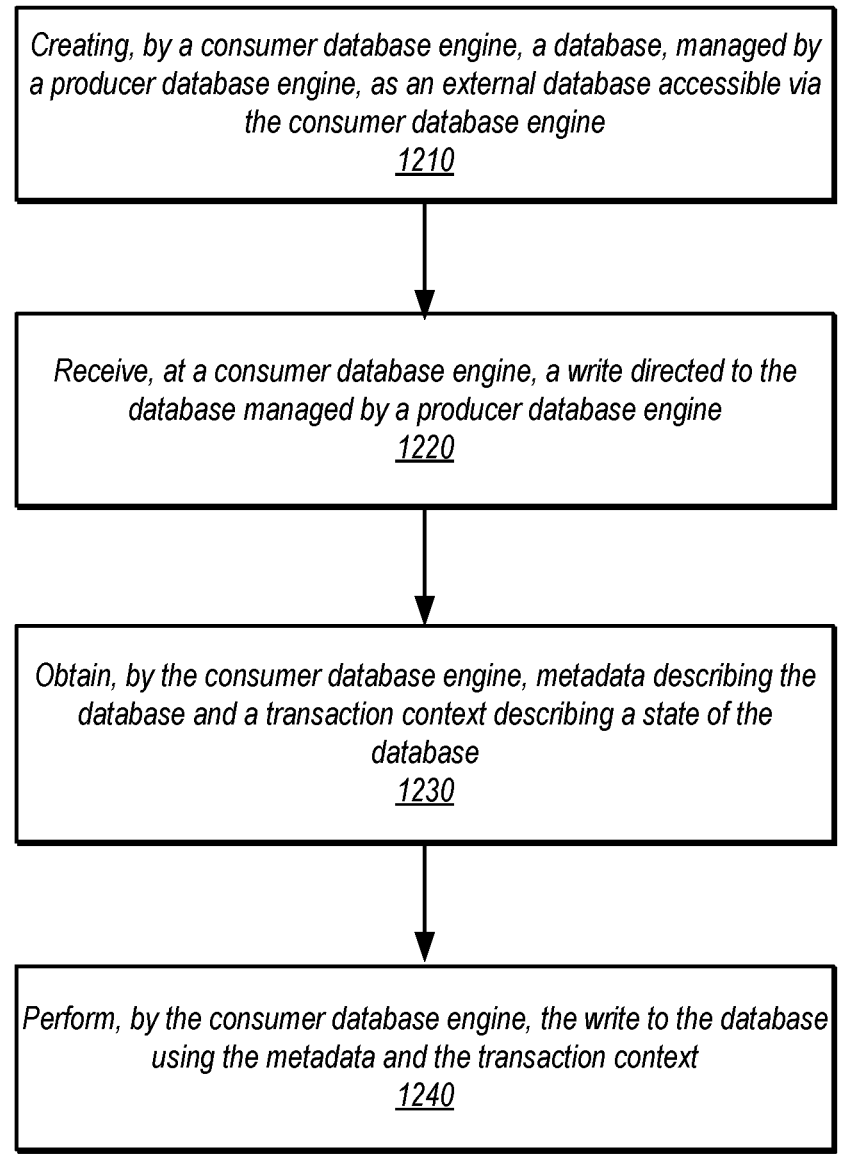
FIG. 12 is a high-level flowchart illustrating methods and techniques to implement performing writes from a consumer database to a producer database, according to some embodiments.

FIG. 12 is a high-level flowchart illustrating methods and techniques to implement performing writes from a consumer database to a producer database, according to some embodiments.

As indicated at 1210, a consumer database engine creates a database, managed by a producer database engine, as an external database accessible via the consumer database engine. Note that in some embodiments described herein, the producer database engine is hosted in a region of the provider network and the consumer database engine hosted in a different region of the provider network. At 1220, the consumer database engine receives a write directed to the database managed by a producer database engine. At 1230, the consumer database engine obtains metadata describing the database and a transaction context describing a state of the database. At block 1240, the consumer database engine performs the write to the database using the metadata and the transaction context.

In some embodiments, the database service includes a control plane, a producer database engine, and a consumer database engine(s). As described herein, the control plane receives a request to share write access to a database managed by the producer database engine with the consumer database engine. Based on the request, the control plane may associate the database with the consumer database engine to enable the shared write access to the database. The consumer database engine may receive a request to create the database as an external database accessible via the consumer database engine and based on the request, create the database as the external database. As described herein, in some embodiments the database service (e.g., control plane or producer database) may authorize an account associated with the consumer database engine to access the producer database responsive to a request to grant permission to the account received at the database service from a different account associated with the producer database engine.

The consumer database engine may obtain metadata describing the database from the producer database engine, obtain a transaction context describing a state of the database from the producer database engine, and use the metadata and the transaction context to perform a write to the producer database or to a particular table(s) of the producer database (in embodiments, the transaction context includes a transaction ID associated with the write/write transaction at the producer database). The consumer database engine may perform the above actions in response to receiving, from a consumer user, the write (e.g., as a query/write request).s In embodiments, the producer database engine may grant any number of locks associated with the write in order to prevent/avoid conflicts when writing data to the producer.

In embodiments, to perform the write at the consumer DB, the consumer DB generates a plan to perform the query using the metadata and the transaction context and executes the query plan. In embodiments, the producer database may commit the write on behalf of the consumer database engine. The producer database may send, to the consumer database engine, an indication that the write was committed. In some embodiments, the producer database abort the write. The producer database may send, to the consumer database engine, an indication that the write was aborted. In some embodiments, the database service is a data warehouse service, the consumer database engine and the producer database engine are respective processing clusters implemented as part of the data warehouse service, and data for the database is stored in a data storage service of the provider network.

Figure 13:
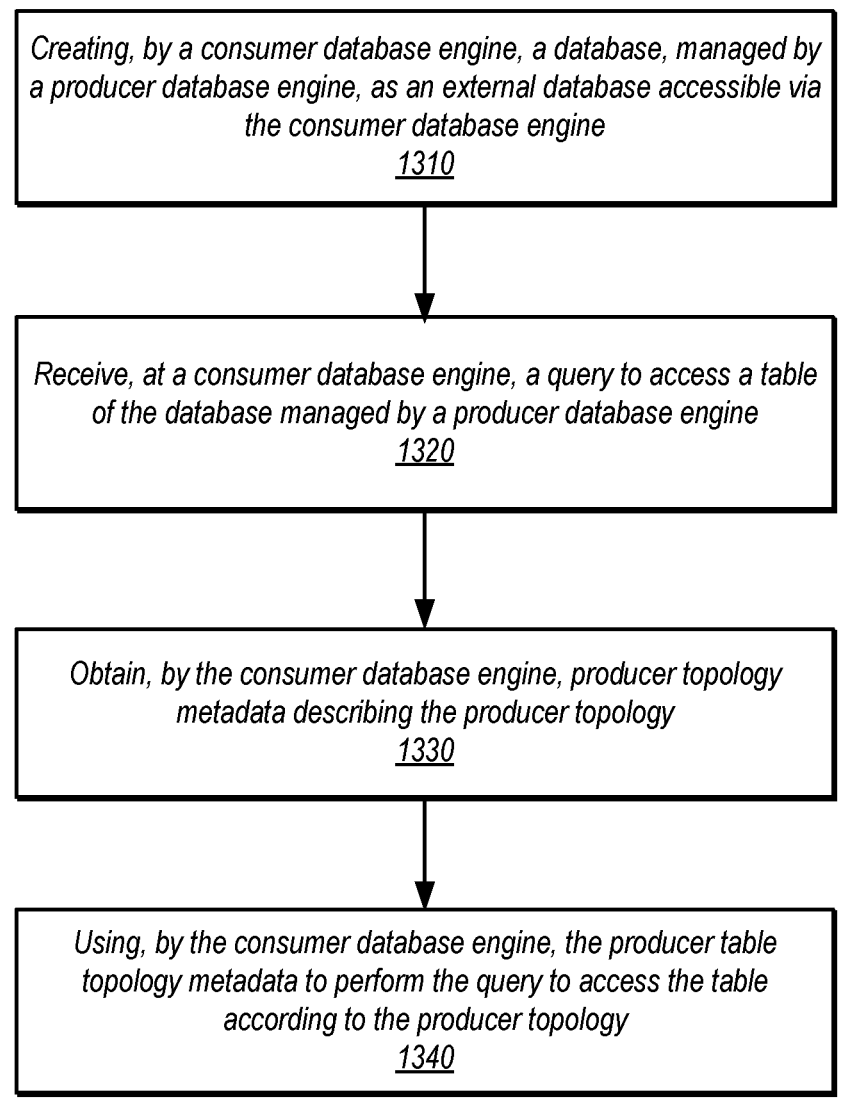
FIG. 13 is a high-level flowchart illustrating methods and techniques to implement accessing a producer database from a consumer database that uses a different topology, according to some embodiments.

FIG. 13 is a high-level flowchart illustrating methods and techniques to implement accessing a producer database from a consumer database that uses a different topology, according to some embodiments.

As indicated at 1310, a consumer database engine creates a database, managed by a producer database engine, as an external database accessible via the consumer database engine. At 1320, the consumer database engine receives a query to access a table of the database managed by a producer database engine. At 1330, the consumer database engine obtains producer topology metadata describing the producer topology. At block 1340, the consumer database engine uses the producer table topology metadata to perform the query to access the table according to the producer topology.

In some embodiments, the consumer database engine may receive a query to access a table of the external database (e.g., from a consumer user). The consumer database engine may determine that the received query accesses the table of the external database. The consumer database engine may obtain producer topology metadata describing the producer topology from the producer database engine and use the producer topology metadata to perform the query to access the table according to the producer topology. In embodiments, in additional to the producer topology metadata, the consumer database engine may obtain the transaction context from the producer database engine and use the producer topology metadata and transaction context to perform the query to access the table according to the producer topology. In embodiments, the producer database engine may grant any number of locks associated with the write in order to prevent/avoid conflicts when writing data to the producer.

In embodiments, to perform the write at the consumer DB, the consumer DB generates a plan to perform the query using the topology metadata (and transaction context if obtained) and executes the query plan. In embodiments, the producer database may commit the write on behalf of the consumer database engine. The producer database may send, to the consumer database engine, an indication that the write was committed. In some embodiments, the producer database abort the write. The producer database may send, to the consumer database engine, an indication that the write was aborted.

Figure 14:
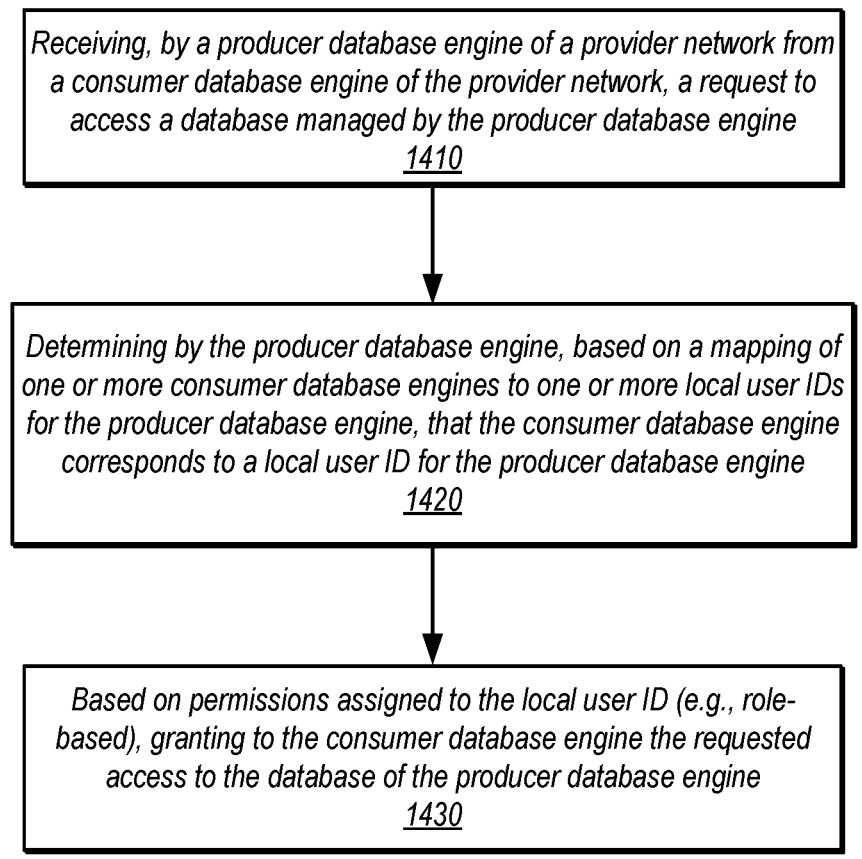
FIG. 14 is a high-level flowchart illustrating methods and techniques to implement granting a consumer database access to a producer database based on local user ID mappings, according to some embodiments.

FIG. 14 is a high-level flowchart illustrating methods and techniques to implement granting a consumer database access to a producer database based on local user ID mappings, according to some embodiments.

As indicated at 1410, a producer database engine receives, from a consumer database engine, a request to access a database managed by the producer database engine (e.g., read and/or write to the database or table(s) of the databases). The received request to access the database may be based on reception, at the consumer database engine, of a query to access the database of the producer database engine. At 1420, the producer database engine determines, based on a mapping of one or more consumer database engines to one or more local user IDs for the producer database engine, that the consumer database engine corresponds to a local user ID for the producer database engine. At 1430, based on permissions assigned to the local user ID, the producer database engine grants to the consumer database engine the requested access (e.g., write) to the database of the producer database engine. In embodiments, the producer engine may commit the write on behalf of the consumer database engine. The producer database may send, to the consumer database engine, an indication that the write was committed. In some embodiments, the producer database abort the write. The producer database may send, to the consumer database engine, an indication that the write was aborted. In embodiments, the producer database may receive and handle access requests for any number of different consumer database engines in the same or similar way as described above.

In some embodiments, the producer database generates logs of database transactions and/or operations (writes, reads, inserts, deletes, create table, etc.) that includes the local user ID of the user associated with the transaction/operation. For example, if a consumer database performs 10 writes to a producer table, the log may include 10 entries that each include the local user ID mapped/assigned to the consumer database. A user/administrator or the producer database may determine that the consumer database performed the 10 writes based on identifying the local user ID and identifying the corresponding consumer database based on the mapping. In embodiments, the producer database may generate an audit report for the consumer database that indicates the 10 writes performed by the consumer database, based on the above determination that the producer database performed the 10 writes. The same steps as above may be performed for any number of consumer databases.

In embodiments, a user/administrator of the consumer database may set permissions on producer objects (e.g., producer database or tables of the producer database) for consumer users. For example, permissions for a user may be set on a particular external table that corresponds to a producer table. This may allow the consumer user/admin to set permissions on remote objects for local users of the consumer database. In order for a query access to be performed on the producer object, the consumer user that submitted the query must have the appropriate permissions assigned to the user (e.g., read and/or write permission, which may be role-based in some embodiments). If not, then the query may be denied/fail. This may allow permissions to be set on the producer side for each consumer database (as described above), as well as permissions to be set on the consumer side for each user.

The methods described herein may in various embodiments be implemented by any combination of hardware and software. For example, in one embodiment, the methods may be implemented by a computer system (e.g., a computer system as in FIG. 15) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments to implement writes from a consumer database to a producer database, access a producer database from a consumer database that uses a different topology, and/or grant a consumer database access to a producer database based on local user ID mappings as described herein may be executed on one or more computer systems, which may interact with various other devices. One such computer system is illustrated by FIG. 15. In different embodiments, computer system 1500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. Display(s) 1580 may include standard computer monitor(s) and/or other display systems, technologies or devices. In at least some implementations, the input/output devices 1550 may also include a touch- or multi-touch enabled device such as a pad or tablet via which a user enters input via a stylus-type device and/or one or more digits. In some embodiments, it is contemplated that embodiments may be implemented using a single instance of computer system 1500, while in other embodiments multiple such systems, or multiple nodes making up computer system 1500, may host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

In some embodiments, at least one processor 1510 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1520 may store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a non-transitory, computer-readable storage medium may include storage media or memory media such as magnetic or optical media, e.g., disk or CD/DVD-ROM coupled to computer system 1500 via I/O interface 1530. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

Figure 15:
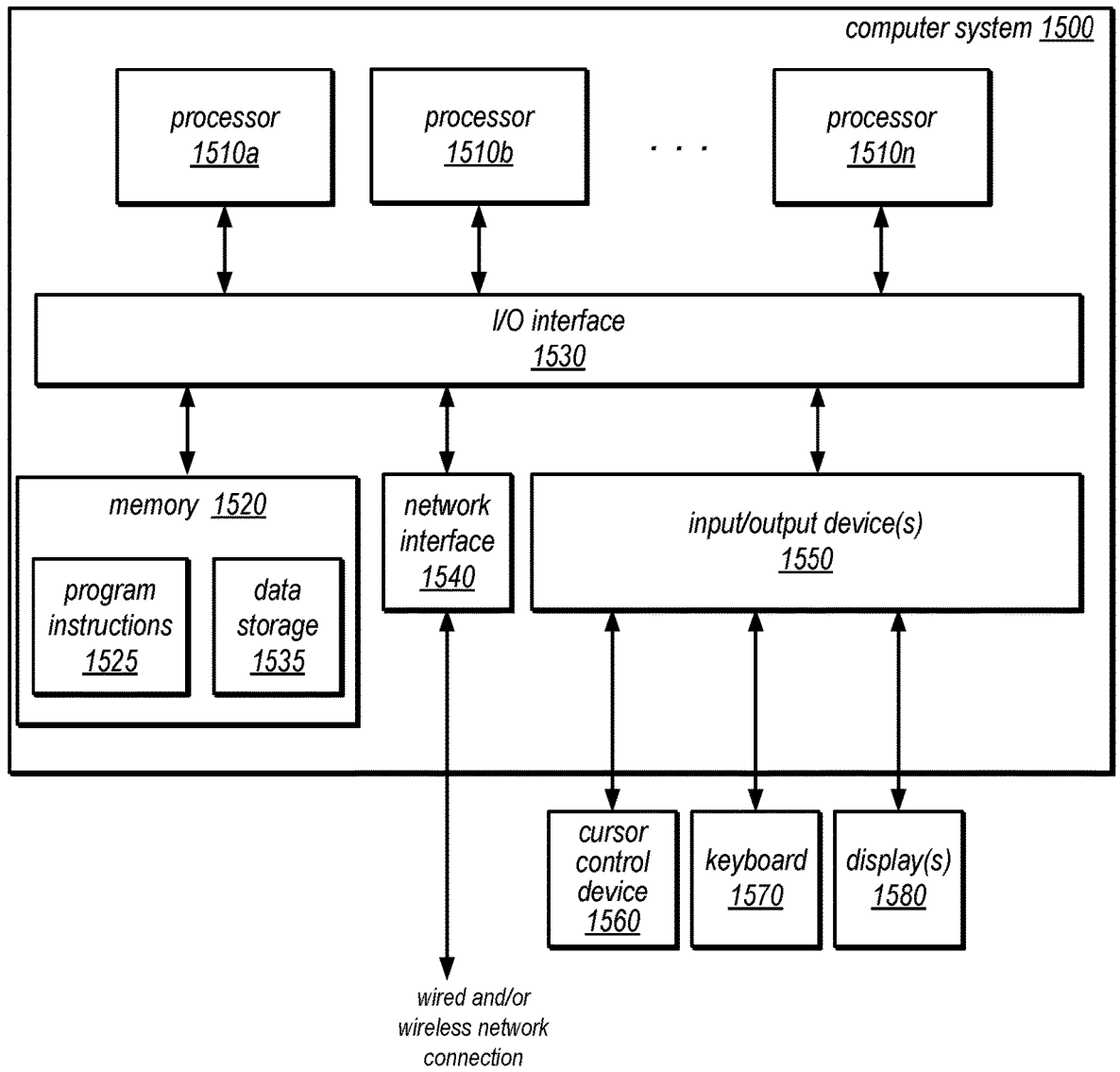
FIG. 15 illustrates an example system that implements the various methods, techniques, and systems described herein, according to some embodiments.

As shown in FIG. 15, memory 1520 may include program instructions 1525, that implement the various methods and techniques as described herein, and data storage 1535, comprising various data accessible by program instructions 1525. In one embodiment, program instructions 1525 may include software elements of embodiments as described herein and as illustrated in the Figures. Data storage 1535 may include data that may be used in embodiments. In other embodiments, other or different software elements and data may be included.

Those skilled in the art will appreciate that computer system 1500 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of computing devices, respectively comprising at least one processor and a memory, that implement a database service of a provider network;
   wherein the database service comprises a control plane, a producer database engine, and a consumer database engine;
   wherein the control plane is configured to:
      receive a request to share write access to a database with the consumer database engine, wherein the database is managed by the producer database engine; and
      associate the database with the consumer database engine to enable the shared write access to the database; and
   wherein the consumer database engine is configured to:
      receive a request to create the database as an external database accessible via the consumer database engine;
      create the database as the external database;
      obtain metadata describing the database from the producer database engine;
      obtain a transaction context describing a state of the database from the producer database engine; and
      use the metadata and the transaction context to perform a write to the database.

2. The system of claim 1, wherein the producer database engine is configured to grant one or more locks associated with the write.

3. The system of claim 1, wherein the producer database engine is configured to commit the write on behalf of the consumer database engine.

4. The system of claim 1, wherein the database service is a data warehouse service, wherein the producer database engine and the consumer database engine are respective processing clusters implemented as part of the data warehouse service, and wherein data for the database is stored in a data storage service of the provider network.

5. A method, comprising:
   creating, by a consumer database engine of a provider network, a database, managed by a producer database engine of the provider network, as an external database accessible via the consumer database engine, wherein the consumer database engine is associated with the database to grant permission to the consumer database engine to write to the database;
   obtaining, by the consumer database engine from the producer database engine, metadata describing the database and a transaction context describing a state of the database; and
   performing, by the consumer database engine, a write to the database using the metadata and the transaction context.

6. The method of claim 5, further comprising granting, by the producer database engine, one or more locks associated with the write.

7. The method of claim 5, further comprising:
   authorizing, by the database service, an account associated with the consumer database engine to access the database responsive to a request to grant permission to the account received at the database service from a different account associated with the producer database engine.

8. The method of claim 5, wherein the producer database engine is hosted in a region of the provider network and the consumer database engine hosted in a different region of the provider network.

9. The method of claim 5, further comprising committing, by the producer database engine, the write on behalf of the consumer database engine.

10. The method of claim 9, further comprising sending, from the producer database engine to the consumer database engine, an indication that the write was committed.

11. The method of claim 5, wherein performing the write to the database comprises:
   generating a plan to perform the query using the metadata and the transaction context; and
   executing the query plan.

12. The method of claim 5, wherein the transaction context comprises a transaction ID associated with the write.

13. The method of claim 5, wherein performing, by the consumer database engine, the write to the database comprises performing the write to a table.

14. One or more non-transitory, computer-readable storage media, storing program instructions that when executed on or across one or more computing devices cause the one or more computing devices to implement:
   receiving, at a consumer database engine of a provider network, a request to create a database as an external database accessible via the consumer database engine, wherein the database is managed by a producer database engine of the provider network, and wherein the consumer database engine is associated with the database to grant permission to the consumer database engine to write to the database;
   creating, by the consumer database engine, the database as the external database;
   obtaining, by the consumer database engine from the producer database engine, metadata describing the database and a transaction context describing a state of the database; and
   using, by the consumer database engine, the metadata and the transaction context to perform a write to the database received at the consumer database engine.

15. The one or more non-transitory, computer-readable storage media of claim 14, wherein the consumer database engine was granted the permission responsive to a request to grant permission to an account associated with the consumer database engine received at a control plane from a different account associated with the producer database engine.

16. The one or more non-transitory, computer-readable storage media of claim 14, wherein, in using the metadata and the transaction context to perform the write to the database received at the consumer database engine, the program instructions cause the one or more computing devices to implement:
   generating a plan to perform the query using the metadata and the transaction context; and
   executing the query plan.

17. The one or more non-transitory, computer-readable storage media of claim 14, further comprising program instructions that when executed on or across one or more computing devices cause the one or more computing devices to implement receiving, from the producer database engine, an indication that the write was committed.

18. The one or more non-transitory, computer-readable storage media of claim 14, further comprising program instructions that when executed on or across one or more computing devices cause the one or more computing devices to implement receiving, from the producer database engine, an indication that the write was aborted.

19. The one or more non-transitory, computer-readable storage media of claim 14, wherein the transaction context comprises a transaction ID associated with the write.

20. The one or more non-transitory, computer-readable storage media of claim 14, wherein the database service is a data warehouse service, wherein the consumer database engine and the producer database engine are respective processing clusters implemented as part of the data warehouse service, and wherein data for the database is stored in a data storage service of the provider network.

* * * * *